3,503,906
CROSS-LINKABLE COMPOSITIONS AND METHOD
OF CROSSLINKING SAID COMPOSITIONS
Karl Brack, Wilmington, Del., assignor to Hercules Incorporated, Wilmington, Del., a corporation of Delaware
No Drawing. Continuation-in-part of application Ser. No. 584,118, Oct. 4, 1966. This application Aug. 3, 1967, Ser. No. 660,166
Int. Cl. C08f 29/02, 29/34, 29/00
U.S. Cl. 260—2.5                                14 Claims

ABSTRACT OF THE DISCLOSURE

A cross-linkable polymer composition is obtained by admixing an unsaturated polymer, a precursor of a polyfunctional nitrile N-oxide of a specified formula, and material that provides upon contact with water at least one alkaline reactant that reacts with the precursor to form the corresponding polyfunctional nitrile N-oxide which in turn cross-links the unsaturated polymer.

---

This application is a continuation-in-part of U.S. Patent application, Ser. No. 584,118, now abandoned, of Karl Brack for Cross-Linkable Compositions.

This invention relates to cross-linkable polymer compositions useful as sealants, adhesives, coatings, etc., and to a process of cross-linking said compositions. More particularly, this invention relates to cross-linkable unsaturated polymer compositions which cross-link on exposure to moisture.

In the past, it has been known to prepare sealant, adhesive and coating formulations by merely dissolving a polymer in a volatile solvent. Such formulations, while acceptable for many applications, suffer serious drawbacks. For example, such formulations are subject to shrinkage due to the evaporation of the solvent. Another disadvantage is the susceptibility of the resulting uncrosslinked product to attack by solvents. Still other sealant and adhesive formulations are based on cross-linkable two component systems. In such formulations two reactive components are admixed just before application. One of the disadvantages of this type of formulation is the fact that it must all be used in a short time period before it cures to an unworkable mass.

Now in accordance with this invention, it has unexpectedly been found that compositions can be prepared which have good shelf life but which will cross-link at normal room temperature (20–25° C.) to solid insoluble products when exposed to moisture, such as atmospheric moisture. Since the compositions can be prepared without using any solvents, there is no shrinkage upon curing. A typical composition of this invention comprises an unsaturated polymer, a precursor of a polyfunctional nitrile N-oxide compound and a latent base.

Any unsaturated polymer, containing ethylenic unsaturation wherein there is at least one hydrogen radical attached to at least one of the carbon atoms of the ethylenic double bond, can be used in the compositions of this invention. Where fluidized compositions are desired, unsaturated polymers having a molecular weight range of from about 1,000 to about 20,000 are preferred. However, higher molecular weight polymers can be used in conjunction with small amounts of solvents and/or plasticizers to obtain the desired fluidity. Typical unsaturated polymers that can be used are polybutadiene-1,2, polybutadiene - 1,4, styrene-butadiene, copolymers, isobutylene-isoprene copolymers, natural rubber, polyester resins such as maleate- and fumarate-containing polyesters and polyacrylates, butadiene-acrylonitrile copolymers, ethylene - propylene-dicyclopentadiene terpolymers, polychloroprene, polyisoprene, unsaturated alkyd resins such as tall oil alkyd resins, polyether copolymers and terpolymers containing at least two unsaturated epoxide constituents such as propylene oxide-allyl glycidyl ether copolymers and ethylene oxide - epichlorohydrin-allyl glycidyl ether terpolymers, etc., and blends of these polymers with each other. In some cases it may be desirable to use partially hydrogenated products of the above unsaturated polymers.

The precursor of a polyfunctional nitrile N-oxide is a compound which has the formula selected from the group consisting of

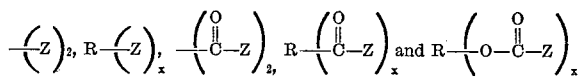

wherein Z is

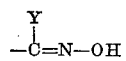

Y is a radical selected from the group consisting of the halide and the nitro radicals, R is an organic radical having a valence greater than 1, generally 2–10, and preferably 2–6, and $x$ is an integer equal to the valence of R.

The halide radicals in the group from which Y is selected comprise the fluoride, chloride, bromide and iodide radicals.

Generally R is selected from the group consisting of the hydrocarbon, halide substituted hydrocarbon, hydrocarbon-oxy-hydrocarbon, hydrocarbon-thio-hydrocarbon, and hydrocarbon-sulfonyl-hydrocarbon polyvalent radicals. In preferred embodiments of this invention R is a divalent organic radical selected from the group consisting of alkylene radicals such as, for example, methylene, ethylene, trimethylene, tetramethylene, pentamethylene, hexamethylene, octamethylene, decamethylene, dodecamethylene, octadecamethylene, and the like; cycloalkylene radicals such as, for example, cyclohexylene, cyclopentylene, cyclooctylene, cyclobutylene, and the like; arylene radicals such as, for example, o-, m-, and p-phenylene, naphthylene, biphenylene, and the like; arylene-dialkylene radicals such as, for example, o-, m-, and p-xylylene, diethylene, o-, m-, and p-phenylene diethylene, and the like; alkylene-diarylene radicals such as, for example, methylene bis(o-, m- and p-phenylene), ethylene bis(o-, m-, and p-phenylene), and the like; cycloalkylene-dialkylene radicals such as, for example, 1,2-, 1,3-, and 1,4-cyclohexane-dimethylene, 1,2- and 1,3-cyclopentane dimethylene, and the like; and the alkylene oxyalkylene radicals, arylene-oxy-arylene radicals, alkarylene-oxy-arylene radicals, alkarylene-oxy-alkarylene radicals, aralkylene-oxy-alkylene radicals, aralkylene oxy-aralkylene radicals, and the like as well as the corresponding thio and sulfonyl radicals, specific examples of which include methylene-oxy-methylene, ethylene-oxyethylene, phenylene-oxy-phenylene, methylenephenyleneoxy - phenylenemethylene, phenylenemethylene - oxymethylenephenylene, ethylene - thio-ethylene, phenylenethio-phenylene, phenylenemethylene-thio-methylenephenylene, butylene-sulfonyl-butylene, and the like radicals. Examples of the precursor of this invention include low molecular weight polymers having substituted along their chains about 2–5 groups selected from the class consisting of hydroximoyl halide groups and carbonylnitrolic acid groups.

These precursors can be prepared by several methods. For example, poly(carbohydroximoyl chloride) having the formula $R(Z)_x$ can be prepared by starting with a polyaldehyde having the desired nucleus, such as succinaldehyde (butanediol), alipaldehyde (hexanediol), phthalaldehyde (1,2-benzenedicarbonal), etc., treating the polyaldehyde with hydroxylamine to convert the aldehyde groups to oximes, and then treating the resulting compound with nitrosylhalide to convert the oxime groups to hydroximoyl halide groups. Polymers containing hydroximoyl halide groups can be prepared by treating in the presence of a low molecular weight unsaturated polymer a bis(carbohydroximoyl halide) with half the calculated amount of base required to completely convert it to a bis(carbonitrile oxide).

The polyfunctional carbonyl hydroximoyl halides having a formula selected from the group consisting of

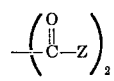

and

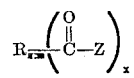

wherein R and Z are as defined above with Y being a halide radical, can be prepared from poly(haloketones). The haloketones are readily produced by the reaction of a poly(acyl halide) with diazomethane to yield a poly (diazoketone), which in turn, on treatment with a hydrogen halide, yields the desired poly(haloketone). Exemplary of the acid halides that can be converted to such poly(haloketones) are compounds having the formula $XCO(CH_2)_mCOX$ wherein X is halide and $m$ is 0–10 or higher, examples of which include the acid halides of oxalic acid, malonic acid, succinic acid, adipic acid, sebacic acid, 1,2,3-propanetricarboxylic acid, 1,2,4-pentanetricarboxylic acid, etc., and other cycloaliphatic and aromatic polycarboxylic acids such as 1,4-cyclohexanedicarboxylic acid, 2-carboxy-2-methyl-cyclohexane acetic acid, ethyleneacrylic acid copolymer, partially hydrolyzed polyalkyl acrylate, diglycollic acid, p-phenylenediacetic acid, thiodiacetic acid, thiodipropionic acid, 4,4'-sulfonyldibutyric acid, phthalic acid, terephthalic acid, 4,4'-biphenyl dicarboxylic acid, trimelletic acid, trimesic acid, naphthalic acid, etc.

Poly(haloacetyl) compounds wherein the haloacetyl groups are directly attached to an aromatic nucleus can also be prepared by introducing two or more haloacetyl groups by means of a normal Friedel-Crafts reaction. Another method is to chlorinate or brominate a polyacetyl aromatic compound in which reaction one chlorine or bromine is introduced into each methyl group. Typical of the poly(haloacetyl) compounds that can be prepared by one or more of these procedures are 1,4-bis(chloroacetyl) benzene, 1,3,5-tris(chloroacetyl) benzene, 4,4'-bis(bromoacetyl) biphenyl, 1,5-bis(chloroacetyl) naphthalene, 4,4'-bis(chloroacetyl) diphenyl ether, etc.

The haloacetyl compounds are then converted to the hydroximoyl halides by reaction with an alkyl nitrite and hydrogen halide under anhydrous conditions. Instead of an alkyl nitrite, other nitrosating agents can be used, as for example, $N_2O_3$, nitrosyl chloride, etc.

An alternative procedure for preparing the polyfunctional carbonylhydroximoyl halides having the formula

is to nitrostate an aliphatic or aromatic polyketone to produce a poly(oximinoketone) which on halogenation yields the poly(carbonylhydroximoyl halide).

The polyfunctional carbonyl nitrolic acids having the formula

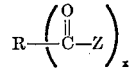

where Y is $-NO_2$, are prepared by the reaction of a polyketone with $N_2O_4$ which yields the poly(carbonyl nitrolic acid) directly.

The polyfunctional carbonylhydroximoyl halides and carbonylnitrolic acids having the formula

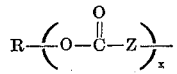

are derived from esters. The carbonylhydroximoyl halides having the above formula where Y is a halide radical are prepared by reaction of an amino ester hydrochloride with sodium nitrite to form a diazo ester and converting the diazo ester with nitrous acid and a hydrogen halide to the hydroximoyl halide. Thus, for example, with glycine, or one of its precursors, such as aminoacetonitrile, it is possible to prepare a wide variety of glycinate esters from diols, triols, etc., which can then be converted by this route to the polyfunctional carbonylhydroximoyl halides. The carbonylnitrolic acids having the above formula where Y is $-NO_2$ are prepared from beta-ketoesters. For example, acetoacetic acid esters can be readily prepared by the reaction of diketene with polyols and then nitrosating the beta-ketoester with aqueous nitrous acid to yield the corresponding oximinoketoester. Treatment of these compounds with concentrated nitric acid gives the nitrolic acid in excellent yield, and treatment of the nitrolic acid with a hydrogen halide then yields the hydroximoyl halide. Actually, the reaction can be carried out in one step by reacting the oximinoketoester with a mixture of nitric acid and hydrogen halide to yield the hydroximoyl halide directly. Still other methods of preparing the precursors will be apparent to those skilled in the art.

A latent base is material which in the absence of water and heat is inert relative to the precursors of this invention, but which upon contact with water provides alkaline substance that reacts with said precursors to form the corresponding polyfunctional nitrile oxides.

In some embodiments of this invention the latent base comprises at least one compound which in the absence of water is inert to the precursor, but which in contact with water becomes basic to the extent it extracts hydrogen halide from the hydroximoyl halide groups and hydrogen nitrite from the nitrolic acid group so as to form nitrile N-oxide groups. In other embodiments the latent base comprises more than one such compound. Typical compounds of this kind comprise aluminum carbide; the alkaline earth metal oxides and carbonates such as magnesium carbonate, calcium oxide, calcium carbonate, strontium oxide, barium oxide, barium carbonate, etc.; and the metal nitrides which in the presence of water become metal hydroxides and ammonia such as calcium nitride, magnesium nitride, etc. Some of the above-mentioned compounds generate a gas such as methane or carbon dioxide when reacted with water, thus causing foaming of the composition and resulting in cellular products. The reaction of a nonfoaming latent base compound such as barium oxide is represented by the following equations:

$$BaO + H_2O \longrightarrow Ba(OH)_2$$

The reaction of a foaming latent base compound such as aluminum carbide is shown by the following equations:

$$Al_4C_3 + 12H_2O \longrightarrow 4Al(OH)_3 + 3CH_4$$

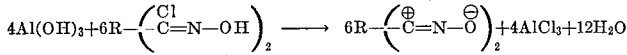

In either case a bis(carbonitrile N-oxide) is formed and it, in turn, reacts to cross-link the unsaturated polymer. It can be seen from the above equations that water is regenerated during the reaction, thus perpetuating the reaction.

In still other embodiments of this invention the latent base comprises molecular sieve material containing alkaline substance that is displaced by or driven out of the sieve material by water. Molecular sieve material, generally available as a free-flowing powder, has an interstitial structure with a high degree of adsorptive affinity for polar molecules. Generally, molecular sieve material consists essentially of crystalline alumino-silicate with a crystal structure of $SiO_4$ tetrahedra and $AlO_4$ tetrahedra that form a cross-linked network with uniform spherical cavities interconnected by uniform openings. Such material is described in the U.S. Patent Nos. 2,882,243 and 2,882,244, to Milton. Preferred examples of alkaline substance contained in the molecular sieve material under the concepts of this invention include ammonia as well as primary, secondary and tertiary amines. Preferred combinations of alkaline substance and molecular sieve material comprise ammonia and sodium zeolite A (described in the '243 patent to Milton), primary amine (methylamine, ethylamine, ethylene diamine, and the like) and calcium-magnesium zeolite A (described in the '243 patent to Milton), and secondary and tertiary amines (dimethylamine, diethylamine, diethylene triamine, trimethylamine, triethylamine, piperazine, and the like) and sodium zeolite X (described in the '244 patent to Milton).

A latent base of this kind is made by contacting preferably at 0–25° C. anhydrous finely divided molecular sieve material with anhydrous alkaline substance usually alone, when it is normally liquid, but in solution in a suitable anhydrous solvent, when it is normally gaseous or solid. The quantity of alkaline substance, quantity of molecular sieve material and length of time of contacting are selected to obtain a desired concentration of adsorbed alkaline substance in the molecular sieve material. Usually, the preferred maximum concentration of adsorbed alkaline substance in the molecular sieve material is about 15–20% by weight of the molecular sieve material, but higher and lower operable concentrations are within the broader concepts of this invention. Subsequently, excess and unadsorbed alkaline substance, if any, are removed from the molecular sieve material as by washing the material.

A feature sometimes of advantage in employing as latent base material in the practice of this invention molecular sieve material containing alkaline substance is that instead of, or in addition to, moisture initiation of the cross-linking reaction, heat triggering or initiation of the reaction can be employed. Generally speaking, alkaline substance that is displaced or driven out of molecular sieve material by water is also displaced or driven out by heat. Hence, when it is desired to heat trigger the cross-linking reaction, preferably only sufficient heat is applied to the cross-linkable composition to cause exudation of the desired quantity of alkaline substance from the molecular sieve material.

Varied amounts of the unsaturated polymer, precursor and latent base can be employed, depending upon the degree of crosslinking desired, the nature of the unsaturated polymer, etc. In general, the amount of nitrile N-oxide precursor employed (based on the weight of the polymer) is from about 1% to about 30%, preferably from about 5% to about 20%. The latent base is present in an amount generally sufficient to effect conversion of substantially all the precursor to the corresponding nitrile N-oxide, preferably in excess by about 20 to about 100% of the amount required to effect conversion of substantially all of the precursor to the nitrile N-oxide.

The cross-linkable compositions of this invention can be made by blending or admixing the ingredients in any desired fashion, provided that moisture is excluded. For example, the unsaturated polymer and nitrile N-oxide precursor are dissolved in an anhydrous volatile solvent and ball milled with the other ingredients under an inert anhydrous atmosphere. After milling, the solvent can be removed under reduced pressure. Of course, particularly when the latent base material comprises molecular sieve material with heat displaceable adsorbed alkaline substance, the blending is carried out preferably at or below 20–25° C.

It may be desirable in certain cases to modify the compositions by prereacting certain of the ingredients. For example, a bis(carbohydroximoyl chloride) can be treated with sufficient free base to convert approximately half of the hydroximoyl chloride groups to nitrile N-oxide groups. When this treatment is conducted in the presence of the unsaturated polymer, the nitrile N-oxide groups will add onto the polymer at its double bonds, producing an unsaturated polymer substituted with carbohydroximoyl chloride substituents. The resulting polymer can be shown as follows:

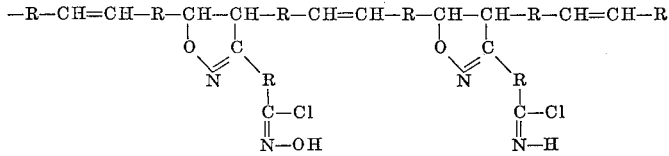

The unsaturated polymer containing a plurality of carbohydroximoyl chloride groups is mixed, as described above, with a latent base. The resulting composition is stable until exposed to moisture, at which time the hydroximoyl chloride groups convert to nitrile N-oxide groups which add onto the remaining double bonds of the polymer, cross-linking the polymer chains.

In addition to the unsaturated polymer, precursor and latent base, other additives can be incorporated into the composition of this invention. Typical additives are fillers such as carbon black, titanium dioxide, diatomaceous earth, talc, etc.; plasticizers such as phthalates, adipates, sebacates, fatty acid esters of pentaerythritol, fatty acid esters of dipentaerythritol, etc.; stabilizers; adhesive promoters; pigments; and so forth. There are embodiments in which other additives are not required or desired and excellent results are achieved when only the basic ingredients are employed.

As indicated above, the compositions of this invention can be stored for long periods of time. The only requirements of such storage is that the compositions be sealed from moisture and, when the latent base material comprises molecular sieve material with heat displaceable alkaline substance, be kept preferably at 20–25° C. To initiate cross-linking, the composition need merely to be exposed to moisture such an atmospheric moisture. Generally, a nontacky skin forms within an hour to two and the composition generally completely cures within a period of about 24–72 hours depending upon its thickness and the specific ingredients used.

The compositions of this invention are useful in numerous applications. For example, they can be used as one-component sealants such as caulking compositions which are fluid enough to extrude into a joint from a caulking gun, but which will not flow once placed in the joint and which cross-link on exposure to the moisture in the air. By using a foaming latent base compound, a caulking composition can be prepared that will expand after it is extruded into the joint. Another use is as an adhesive. Compositions of this invention are excellent adhesives for bonding glass, metals, wood, plastics, fabrics, etc. Still another use is as air dried coating compositions. Other uses will be apparent to those skilled in the art.

The following examples illustrate preferred specific compositions of this invention. All parts and percentages are by weight.

EXAMPLE 1

A sealant composition is prepared by charging the following ingredients to a ball mill under an anhydrous atmosphere of nitrogen:

Ingredients: Parts
Bis(hydroxyethoxyethyl) dimerate-maleic anhydride copolyester [1] _____ 20
Terephthalohydroximoyl chloride _____ 3.63
Anhydrous barium oxide _____ 5
Plasticizer [2] _____ 20
Carbon black (medium thermal) _____ 10
Anhydrous acetone _____ 300

[1] Containing approximately 14.8% by weight maleic anhydride, having a molecular weight of 2750, a bromine number of 32, an acid number of 25.8, and an ester number of 219.
[2] High molecular weight dipentaerythriton fatty acid ester having an acid number of less than 0.1 and a specific gravity of 1.015 at 25/25° C.

The copolyester, plasticizer and terephthalohydroximoyl chloride are dissolved in the anhydrous acetone. Then the barium oxide and carbon black are added. The mixture is milled for 48 hours and then the acetone solvent is removed under vacuum at room temperature. The resulting composition typically is a black creamy paste.

When a sample of the composition is applied as a ⅛-inch film to glass, aluminum, stainless steel, and polyvinyl chloride panels with a film knife, and then exposed to the atmosphere at a temperature of 70° F. and a relative humidity of 40–50%, the films typically form a nontacky skin within 2 hours and are integrally cured to a medium hard rubbery coating after 48 hours. The films typically adhere well to all the substrates. When the coated panels are tested by immersion in acetone, ethyl alcohol, methylene chloride, methyl isobutyl ketone, and tetrahydrofuran at room temperature, the films typically are insoluble in all the solvents. On the other hand, a sample of the composition after being stored for 2 months in the absence of moisture typically is soluble in the above test solvents. When cured at test specimens ⅛ inch in thickness are prepared by placing samples of the above composition in molds lined with poly(tetrafluoroethylene) and exposing them to atmospheric moisture, the specimens typically have a tensile strength of 107 p.s.i., an elongation at break of 80%, and a Shore A hardness of 44.

EXAMPLE 2

The following ingredients are charged to a ball mill under an atmosphere of nitrogen as described in Example 1:

Ingredients: Parts
Bis(hydroxyethoxyethyl) dimerate-maleic anhydride copolyester [1] _____ 20
Terephthalohydroximoyl chloride _____ 3.65
Aluminum carbide _____ 3.6
Plasticizer [2] _____ 10
Carbon black (medium thermal) _____ 10
Anhydrous acetone _____ 300

[1] As described in Example 1.
[2] As described in Example 1.

The mixture is milled for 48 hours and then the acetone solvent is removed under vacuum at room temperature. The resulting creamy paste is the desired product.

When a sample of the product is tested by applying it as a ⅛ inch film to glass, aluminum, stainless steel, polyvinyl chloride, and brick panels with a film knife and then exposing the panels to the atmosphere at a temperature of 70° F. and relative humidity of 40–60%, the films typically form a nontacky skin within 2 hours and during the following 48 hours the films typically expand to approximately ½ inch thickness and cure to a medium hard rubbery coating. When one of the expanded films is cut through, it generally is found to contain small closed cells very much like a foam rubber. The films typically adhere well to all the substrates, and are insoluble in acetone and methyl isobutyl ketone.

EXAMPLE 3

The following ingredients are charged to a ball mill under an atmosphere of nitrogen as described in Example 1:

Ingredients: Parts
Oxyethylene ether of bisphenol A-maleic anhydride copolyester [1] _____ 20
Terephthalohydroximoyl chloride _____ 2.4
Anhydrous barium oxide _____ 3.6
Dioctyl phthalate _____ 10
Carbon black (medium thermal) _____ 5
Anhydrous acetone _____ 300

[1] Having a melting point of 99° C., an acid number of 3 and containing approximately 25% by weight of maleic anhydride.

The mixture is milled for 48 hours and then the acetone solvent is removed under vacuum at room temperature. The resulting composition, the desired product, typically is a heavy paste.

When a sample of the composition is tested by applying it with a film knife so as to form ⅛ inch films on glass, aluminum, stainless steel and brick panels, and then exposing the panels to the atmosphere at a temperature of 70° F. and a relative humidity of 40–60%, the films typically form a tough skin within 2 hours and cure integrally to a hard but flexible coating after 48 hours. The cured films typically adhere well to all the substrates, and are insoluble in acetone.

EXAMPLE 4

The following ingredients are charged to a ball mill under an atmosphere of nitrogen as described in Example 1:

Ingredients: Parts
Oxyethylene ether of bisphenol A-maleic anhydride copolyester [1] _____ 20
Terephthalohydroximoyl chloride _____ 2.4
Aluminum carbide _____ 2.4
Carbon black (medium thermal) _____ 5
Anhydrous acetone _____ 300

[1] As described in Example 3.

The mixture is milled for 48 hours and then the acetone solvent is removed under vacum at room temperature. The resulting heavy paste is the desired product.

When a sample of the product is tested by applying it with a film knife so as to form ⅛ inch thick films on glass, stainless steel, aluminum and brick panels, and then exposing the panels to the atmosphere at a temperature of 70° F. and a relative humidity of 40–60%, the films typically form a tough skin within 2 hours. During the following 48 hours, the films typically expand to approximately ⅜ inch thickness and cure to a hard cellular product. The cured films typically adhere well to all these substrates, and are insoluble in acetone, methyl isobutyl ketone, tetrahydrofuran, and toluene.

EXAMPLE 5

The following ingredients are charged to a ball mill under an atmosphere of nitrogen as described in Example 1:

| Ingredients: | Parts |
| --- | --- |
| Styrene-butadiene copolymer [1] | 20 |
| Terephthalohydroximoyl chloride | 2.0 |
| Anhydrous barium oxide | 3.0 |
| Dioctyl phthalate | 5 |
| Carbon black (medium thermal) | 10 |
| Anhydrous tetrahydrofuran | 200 |

[1] Having a molecular weight of 2000 and containing approximately 66% styrene.

The mixture is milled for 48 hours, and then the tetrahydrofuran solvent is removed under vacuum at room temperature. The resulting creamy paste is the desired product.

Testing of samples of the product as ⅛ inch films cast on glass, stainless steel, aluminum, polyvinyl chloride and brick panels, followed by exposure to the atmosphere at a temperature of 70° F. and a relative humidity of 40–60% generally results in the films forming a nontacky skin within 2 hours and curing to hard, tough, rubbery coatings after 48 hours. All the cured samples usually adhere well to these substrates, and are insoluble in acetone, toluene, tetrahydrofuran, methyl isobutyl ketone, and methylene chloride.

EXAMPLE 6

The following ingredients are charged to a ball mill under an atmosphere of nitrogen as described in Example 1:

| Ingredients: | Parts |
| --- | --- |
| Styrene-butadiene copolymer [1] | 20 |
| Terephthalohydroximoyl chloride | 2.0 |
| Aluminum carbide | 2.0 |
| Plasticizer [2] | 5 |
| Carbon black (medium thermal) | 10 |
| Anhydrous tetrahydrofuran | 200 |

[1] As described in Example 5.
[2] A high boiling pentaerythritol fatty acid ester having an acid number of less than 0.1 and a specific gravity of 0.997 at 25/25° C.

The mixture is milled for 48 hours and then the tetrahydrofuran is removed under vacuum at room temperature. The resulting creamy paste is the desired product.

When samples of the product are spread with a film knife to a ⅛ inch thickness on glass, aluminum, stainless steel, polyvinyl chloride and brick panels, and the panels then exposed to the atmosphere at a temperature of 70° F. and a relative humidity of 40–60% the samples typically form nontacky skins within 2 hours. During the following 48 hours the spread samples expand to approximately ½ inch thickness and cure to a tough rubbery cellular product. The films adhere well to all the substrates, and are insoluble in tetrahydrofuran, methyl butylketone, toluene and methylene chloride.

EXAMPLE 7

A sample of the bis(hydroxyethoxyethyl) dimerate-maleic anhydride copolyester described in Example 1 is prereacted with dichloroglyoxime as follows: 20 parts of the copolyester and 2 parts of the dichloroglyoxime are dissolved in 100 parts of anhydrous tetrahydrofuran. Then 1.3 parts of triethylamine dissolved in anhydrous tetrahydrofuran are added dropwise with agitation. After the addition, the reaction mixture is agitated for 30 minutes and then filtered to remove precipitated triethylamine hydrochloride. A suspension of 4 parts of finely ground barium oxide in the plasticizer described in Example 1 is added with agitation, and then the tetrahydrofuran solvent is removed under vacuum at room temperature. The resulting heavy milky oil is the desired product.

When a sample of this product is tested by applying it with a film knife as a ⅛ inch film to glass, aluminum and polyvinyl chloride panels, and subsequently exposing the panels to the atmosphere at a temperature of 70° F. and a relative humidity of 40–60%, the films generally form a nontacky skin within 3 hours and integrally cure within 72 hours. The films usually adhere well to all these substrates and are insoluble in acetone.

EXAMPLE 8

The following ingredients are charged to a ball mill under an atmosphere of nitrogen as described in Example 1:

| Ingredients: | Parts |
| --- | --- |
| Bis(hydroxyethoxyethyl) dimerate-maleic anhydride copolyester [1] | 15.5 |
| 4,4'-oxybis (phenyl glyoxylohydroximoyl chloride) | 3.8 |
| Anhydrous barium oxide | 5.0 |
| Plasticizer [2] | 10.0 |
| Anhydrous acetone | 100.0 |

[1] As described in Example 1.
[2] As described in Example 6.

The mixture is milled for 24 hours and then the acetone is removed under vacuum at room temperature. The resulting resinous oil is the desired product.

A sample of the product can be tested by spreading it with a film knife to a ⅛ inch thickness on glass, stainless steel, polyvinyl chloride and brick panels, and subsequently exposing the thus coated panels to the atmosphere at a temperature of 70° F. and a relative humidity of 40–60%. The films typically form a nontacky skin within 2 hours and cure to tough, rubbery coatings after 48 hours. All the cured films typically adhere well to the substrates and are insoluble in acetone. On the other hand, a sample of the product maintained in an anhydrous atmosphere generally is still uncured after 2 months. When test specimens of an uncured sample of the product, ⅛ inch in thickness, are prepared as described in Example 1, and cured, the cured specimens typically have a tensile strength of 210 p.s.i., an elongation at break of 105% and a Shore A hardness of 41.

EXAMPLE 9

A solution is prepared by dissolving 20 parts of the bis-(hydroxyethoxyethyl) dimerate-maleic anhydride copolyester described in Example 1, 3.6 parts of terephthalohydroximoyl chloride and 5 parts of the plasticizer described in Example 1 in 20 parts of anhydrous acetone. The solvent is removed under vacuum leaving a clear, medium light oil. This oil is transferred to a mortar under an anhydrous atmosphere, and 1.8 parts of calcuim nitride are added. The mixture is ground until a fine, homogeneous suspension is obtained. Then 2 parts of carbon black (medium thermal) are added and the grinding is continued until the mixture is homogenous again. The composition thus obtained is the desired product.

When a sample of the product is tested by applying it with a film knife so as to form a ⅛ inch film on a glass panel, and then exposing the coated panel to the atmosphere at a temperature of 80° F. and a relative humidity of 50%, the film on the panel typically forms a tough skin within 45 minutes and is integrally cured after 16 hours. The cured film typically adheres well to the panel and is insoluble in acetone. A sample of the product maintained in an anhydrous atmosphere typically is still uncured after 2 months.

EXAMPLE 10

A composition of this invention is made by following exactly Example 9, except 1.4 parts of magnesium nitride are substituted for the 1.8 parts of calcium nitride.

When a sample of the composition is tested by applying it with a film knife so as to form a ⅛ inch film on a glass panel, and the glass panel is then exposed to the atmosphere at a temperature of 80° F. and a relative humidity of 50%, the film generally forms a tough skin with 1 hour and integrally cures after 24 hours. The cured film typically adheres well to the panel and is insoluble in acetone.

EXAMPLE 11

The following ingredients are charged to a ball mill under an atmosphere of nitrogen as described in Example 1:

| Ingredients: | Parts |
| --- | --- |
| Bis(hydroxyethoxyethyl) dimerate-maleic anhydride copolyester [1] | 15.5 |
| 4,4'-oxybis (phenyl glyoxylohydroximoyl chloride) | 3.8 |
| Anhydrous barium oxide | 2.5 |
| Plasticizer [2] | 2.5 |
| Carbon black (medium thermal) | 5.0 |
| Anhydrous acetone | 100 |

[1] As described in Example 1.
[2] As described in Example 6.

The mixture is milled for 16 hours and then the acetone is removed under vacuum at room temperature. The resulting composition, which is the one desired, is typically a creamy paste.

When test specimens ⅛ inch in thickness are prepared by placing samples of this composition in molds lined with poly-(tetrafluoroethylene) and exposing them to atmospheric moisture, generally after 48 hours the specimens integrally cure to medium hard rubbery products which are insoluble in acetone, methyl isobutyl ketone and methylene chloride.

EXAMPLE 12

The following ingredients are charged to a ball mill under an atmosphere of nitrogen as described in Example 1.

| Ingredients: | Parts |
| --- | --- |
| Styrene-butadiene copolymer [1] | 20 |
| 4,4' - bis(phenyl glyoxylohydroximoyl chloride) | 3.5 |
| Anhydrous barium oxide | 3.0 |
| Dioctyl phthalate | 5.0 |
| Carbon black (medium thermal) | 10.0 |
| Anhydrous tetrahydrofuran | 200 |

[1] As described in Example 5.

The mixture is milled for 18 hours and then the tetrahydrofuran solvent is removed under vacuum at room temperature, giving the desired composition.

When test specimens ⅛ inch in thickness are prepared by placing samples of this composition in molds lined with poly(tetrafluoroethylene) and exposing them to atmospheric moisture, usually after 48 hours the specimens integrally cure to hard, tough, rubbery products which typically are insoluble in tetrahydrofuran, toluene, acetone and methyl isobutyl ketone.

EXAMPLE 13

The following ingredients are charged to a ball mill under an atmosphere of nitrogen as described in Example 1.

| Ingredients: | Parts |
| --- | --- |
| Bis(hydroxyethoxyethyl) dimerate-maleic anhydride copolyester [1] | 15.5 |
| 4,4'-methylene bis(phenyl glyoxylohydroximoyl chloride) | 3.8 |
| Anhydrous barium oxide | 2.5 |
| Plasticizer [2] | 2.5 |
| Carbon black (medium thermal) | 5.0 |
| Anhydrous acetone | 100 |

[1] As described in Example 1.
[2] As described in Example 6.

The mixture is milled for 16 hours and then the acetone is removed under vacuum at room temperature, giving the desired composition, typically a creamy paste.

When test specimens ⅛ inch in thickness are prepared by placing samples of the composition in molds lined with poly(tetrafluoroethylene) and exposing them to atmospheric moisture, typically after 48 hours, the specimens integrally cure to medium hard rubbery products which usually are insoluble in acetone, methyl isobutyl ketone and methylene chloride.

EXAMPLE 14

22.3 parts of anhydrous copolyester (made from dimer acid, maleic anhydride, and diethylene glycol; MW 2700; acid No. 50.8; ester No. 242; 10.3% fumarate ester, calcd. as acid, and 4.1% maleate ester, calculated as acid) and 4.7 parts of anhydrous terephthalohydroximoyl chloride are dissolved in 30 parts of anhydrous tetrahydrofuran. Then the solvent is removed under reduced pressure. To the residue are added 9.8 parts of calcium-magnesium zeolite A (effective openings=5 A.) containing ethylene diamine at a concentration of about 10% of the zeolite. The mixture is milled until a homogeneous cream-colored oil was obtained. This is the desired product.

A sample of this product generally can be kept in a tightly closed container for 6 months without crosslinking. On the other hand a sample of this product, when exposed to the atmosphere as a film of ⅛" thickness typically cures to a tetrahydrofuran insoluble rubber within 48 hours.

EXAMPLE 15

20 parts of anhydrous polypropylene oxide-triol tri(undecylenate) made by reacting a propylene oxide adduct of trimethylolpropane, which adduct has a molecular weight of about 4000, and undecylenic acid at a mole ratio of acid to adduct of 3:1, and having an acid No. of 1.0 and an ester No. of 37.8, and 2.65 parts of anhydrous terephthalohydroximoyl chloride are dissolved in 100 parts anhydrous tetrahydrofuran. After a homogeneous solution is achieved, the solvent is removed under reduced ambient pressure. Then residue is milled together with 5.6 parts of the ethylene diamine charged molecular sieve material described in Example 14, until a homogeneous suspension is obtained. This suspension is a composition of this invention.

When a sample of the suspension is kept in a tightly closed container, no change is apparent after 4 months of storage. However, when a sample is exposed to the open atmosphere as a film of ⅛ inch thickness, typically it cross-links to an insoluble rubber within 2 days.

EXAMPLE 16

40 parts of anhydrous vinylated polypropylene oxide triol made by reacting a propylene oxide adduct of trimethylolpropane, which adduct has a molecular weight of about 4000, and acetylene at a mole ratio of acetylene to adduct of 3:1, said triol having a molecular weight of about 4075 and a methylene content of 1.1% (by infrared spectroscopy), and 4 parts of anhydrous 4,4'-bis(phenyl glyoxylohydroximoyl chloride) are dissolved in 100 parts anhydrous tetrahydrofuran. To the resulting solution are admixed 12 parts of anhydrous titanium dioxide and 2 parts of anhydrous Bentonite clay. Then the solvent is removed under reduced ambient pressure. The resulting paste is blended with 12 parts of the ethylene diamine charged molecular sieve material described in Example 14, until homogenous. A heavy white paste is obtained. This is the desired product, a composition of this invention.

In the absence of moisture, it typically does not cross-link during 6 months of storage. On the other hand, a ⅛ inch thick film of it when exposed to the open atmosphere generally cross-links integrally within 48 hours.

EXAMPLE 17

40 parts of anhydrous polypropylene oxide-triol-tri(allyl urethane) made by reacting a propylene oxide adduct of trimethylolpropane, which adduct has a molecular weight of about 4000, and allylisocyanate at a mole ratio allylisocyanate to adduct of 3:1, having a molecular weight of about 4250, 1% methylene and nil hydroxyl (by IR spectroscopy), and 4.2 parts of anhydrous 4,4'-methylene bis(phenyl glyoxylohydroximoyl chloride) are dissolved in 100 parts anhydrous tetrahydrofuran. Then 12 parts of anhydrous titanium dioxide and 2 parts of anhydrous Bentonite clay are admixed with the resulting solution. The solvent then is removed under reduced ambient pressure. The resulting paste is blended with 12 parts of the ethylene diamine charged molecular sieve material described in Example 14, until homogenous. The resulting product, usually a heavy paste, is a composition of this invention.

Typically this product does not cross-link in the absence of moisture for more than 6 months. On the other hand, a ⅛ inch thick film of it generally cross-links to a tough rubber within 48 hours when exposed to the open atmosphere.

EXAMPLE 18

100 parts of an anhdrous isobutylene-isoprene copolymer (molecular weight of about 10,000; containing 4 mole persent isoprene and, therefore, containing about 7 double bonds per polymer chain) and 13 parts of anhydrous 4,4'-bis(phenyl glyoxylohydroximoyl chloride) are dissolved in 100 parts of anhydrous tetrahydrofuran. To the resulting solution are admixed 30 parts of anhydrous titanium dioxide and 5 parts of anhydrous Bentonite clay. Then the solvent is removed. The residue is blended on a roller type mill in the absence of moisture with 25 parts of the ethylene diamine charged molecular sieve material described in Example 14. The result, the desired product, is generally a heavy paste.

Typically the product does not change during storage over 6 months in the absence of moisture. However, a ⅛ inch thick film of it, when exposed to the open atmosphere, usually cross-links integrally during 1 week.

Thus, this invention, provides cross-linkable unsaturated polymer compositions, the cross-linking or cure of which is moisture initiated.

Other features, advantages and specific embodiments of this invention will be readily apparent to those in the exercise of ordinary skill in the art after reading the foregoing disclosures. These specific embodiments are within the scope of the claimed subject matter unless otherwise indicated. Moreover, while specific embodiments of this invention have been described in considerable detail, variations and modifications of the embodiments can be effected without departing from the spirit and scope of the claimed subject matter.

What I claim and desire to protect by Letters Patent is:

1. A cross-linkable composition comprising (1) an ethylenically unsaturated polymer, (2) a precursor of a polyfunctional nitrile N-oxide compound having the formula selected from the group consisting of

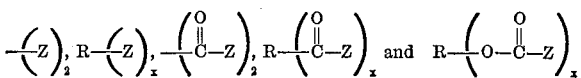

wherein Z is

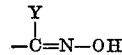

Y is a radical selected from the group consisting of the halide and nitro radicals, R is an organic radical having a valence greater than 1, and $x$ is an integer equal to the valence of R, and (3) a latent base comprising a material which in the absence of water and heat is inert to said precursor, but which upon contact with water provides alkaline substance that reacts with said precursor to form the corresponding polyfunctional nitrile N-oxide compound.

2. The composition according to claim 1, wherein the latent base comprises barium oxide.

3. The composition according to claim 1, wherein the latent base comprises a compound that reacts with moisture to form a gas.

4. The composition according to claim 3 wherein the latent base comprises aluminum carbide.

5. The composition according to claim 1 wherein the latent base comprises calcium nitride.

6. The composition according to claim 1, wherein the latent base comprises molecular sieve material containing alkaline substance displaceable therefrom by moisture.

7. The composition according to claim 6, wherein said alkaline substance comprises ethylene diamine.

8. A cross-linkable composition comprising (1) an ethylenically unsaturated polymer containing a plurality of carbohydroximoyl halide groups and (2) a latent base comprising a material which in the absence of water and heat is inert to said precursor, but which upon contact with water provides alkaline substance that reacts with said precursor to form the corresponding polyfunctional nitrile N-oxide compound.

9. A process of cross-linking an ethylenically unsaturated polymer, which comprises exposing to moisture said polymer in admixture with a precursor of a polyfunctional nitrile N-oxide compound having the formula selected from the group consisting of

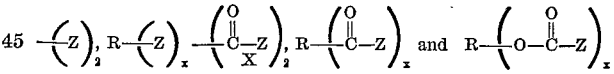

wherein Z in

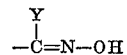

Y is a radical selected from the group consisting of the halide and nitro radicals, R is an organic radical having a valence greater than 1, and $x$ is an integer equal to the valence of R and a latent base comprising a material which in the absence of water and heat is inert to said precursor, but which upon contact with water provides alkaline substance that reacts with said precursor to form the corresponding polyfunctional nitrile N-oxide compound.

10. A process according to claim 9, wherein said latent base comprises a compound which reacts with moisture to form a gas.

11. A process according to claim 9, wherein said latent base comprises molecular sieve material containing alkaline substance displaceable therefrom by moisture.

12. A process for cross-linking an unsaturated polymer in a composition comprising (A) said polymer, (B) a latent base comprising molecular sieve material which in the absence of water and heat is inert to said precursor recited below, but which upon heating provides alkaline substance that reacts with said precursor recited below to form the corresponding polyfunctional nitrile oxide compound, (C) a precursor of a polyfunctional nitrile N-oxide compound having the formula selected from the group consisting of

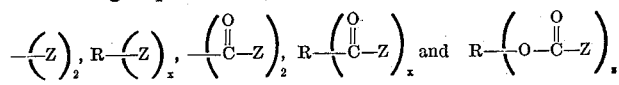

wherein Z is

Y is a radical selected from the group consisting of the halide and nitro radicals, R is an organic radical having a valence greater than 1, and $x$ is an integer equal to the valence of R, which comprises: heating said composition sufficiently to substantially displace said alkaline substance from said molecular sieve material.

13. The composition according to claim 1, wherein the ethylenically unsaturated polymer is an alkylene oxide polyether copolymer containing at least two unsaturated epoxide constituents.

14. A process according to claim 9, wherein the ethylenically unsaturated polymer is an alkylene oxide polyether copolymer containing at least two unsaturated epoxide constituents.

References Cited

UNITED STATES PATENTS 3,390,204    6/1968    Breslow _____ 260—837

SAMUEL H. BLECH, Primary Examiner
MORTON FOELAK, Assistant Examiner

U.S. Cl. X.R.

260—2, 22, 41, 41.5, 47, 75, 80.7, 83.1, 83.3, 84.7, 85.3, 88.3, 89.5, 94.7, 545, 768

PO-1050
(5/69)

UNITED STATES PATENT OFFICE
CERTIFICATE OF CORRECTION

Patent No. _3,503,906_  Dated _March 31, 1970_

Inventor(s) _Karl Brack_

It is certified that error appears in the above-identified patent and that said Letters Patent are hereby corrected as shown below:

Col. 3, line 11 of the printed patent, " (butanediol), alipaldehyde (hexanediol), " should read -- (butanedial), adipaldehyde (hexanedial), --.

Col. 4, line 8 of the printed patent " nitrostate " should read -- nitrosate --.

Col. 4, line 25 of the printed patent, the bond through the second parenthesis should be omitted.

Col. 13, line 37 of the printed patent, " anhdrous " should read -- anhydrous --.

Col. 13, line 39 of the printed patent, " persent " should read -- % --.

In The Claims, Claim, 9, line 46, omit " X " appearing under the formula, the third formula.

Also in Claim 9, line 48, " wherein Z in " should read -- Wherein Z is --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents